United States Patent
Maltby

[15] 3,706,980
[45] Dec. 19, 1972

[54] RF SYSTEM FOR MEASURING THE LEVEL OF MATERIALS

[72] Inventor: Frederick L. Maltby, Montgomery County, Pa.

[73] Assignee: Drexelbrook Controls, Inc.

[22] Filed: April 27, 1970

[21] Appl. No.: 32,002

[52] U.S. Cl............340/244 C, 73/304 C, 324/61 R
[51] Int. Cl.....................G01f 23/26, G08b 21/00
[58] Field of Search........73/290 R, 304 C; 324/61 R; 340/244 C

[56] References Cited

UNITED STATES PATENTS

| | | |
|---|---|---|
| 3,119,266 | 1/1964 | Atkinson.................324/61 X |
| 3,436,653 | 4/1969 | Thiele et al..............324/61 X |
| 3,553,575 | 1/1971 | Shea.....................73/304 C X |
| 3,376,746 | 4/1968 | Roberts................73/304 C X |
| 3,391,547 | 7/1968 | Kingston...............73/304 C |

Primary Examiner—Louis R. Prince
Assistant Examiner—Frederick Shoon
Attorney—Woodcock, Washburn, Kurtz & Mackiewicz

[57] ABSTRACT

In an RF system which measures the level of materials, the probe includes a measuring electrode and a guard shield. The guard shield is interposed between the electrode and a conductive member, commonly the container for the material, throughout the body of the probe. The variable capacitance between the measuring electrode and the conductive member is a measurement of the level of the material. This variable capacitance is connected in a capacitance bridge. An operational amplifier has its input connected to the junction of two fixed adjacent arms of the bridge and has its output connected to the guard shield to maintain the guard shield at the same potential as the measuring electrode. This prevents deposits of foreign material on the probe from affecting the measurement. An output amplifier is connected between the output of the first amplifier and a junction of two opposite adjacent arms of the bridge. Connection of the output amplifier in this manner prevents changes in the input impedance of the output amplifier from changing the zero point of the bridge.

9 Claims, 8 Drawing Figures

PATENTED DEC 19 1972

RF SYSTEM FOR MEASURING THE LEVEL OF MATERIALS

BACKGROUND OF THE INVENTION

This invention relates to radio frequency (RF) systems for determining measuring or the level of materials.

Capacitance type measuring systems have been used in industry for monitoring and measuring process conditions. An example of such a system is shown in U.S. Pat. No. 3,339,412 Maltby. Such systems measure the capacitance between an electrode and a conductive member, usually the vessel containing the material whose level is to be determined. Attempts have been made to include additional electrodes in the probe, for example, to prevent stray leakage between the measuring electrode and the vessel. One example of such a system is shown in the U.S. Pat. No. 3,119,266 Atkinson.

SUMMARY OF THE INVENTION

In accordance with an important aspect of the present invention, the output amplifier is connected in the capacitance bridge in such a manner that changes in impedance of the amplifier do not change the zero point of the output voltage-capacitance curve. Specifically, the capacitance bridge includes first and second capacitors as two fixed adjacent arms of the bridge. The opposite adjacent arms include a manually adjustable capacitor and the variable probe-to-vessel capacitance. A first operational amplifier has its input connected to the junction of the two fixed adjacent arms and has its output connected to the guard shield so that the guard shield is maintained at the same potential as the junction between the fixed adjacent arms and the potential of the measuring electrode when the bridge is at balance. The output amplifier has its two inputs connected between the output of the first amplifier and the junction of the opposite adjacent arms which include the capacitance to be measured.

In accordance with another important aspect of the present invention, the probe is constructed so that the guard shield is between the measuring electrode and the vessel throughout the body of the probe. Because of this the probe can be used in high temperature applications. Normally, high temperatures affect the capacitance measurement because the dielectric constant of the insulation varies unpredictably with temperature. Also, all insulators become leaky at high temperatures. In a probe constructed in accordance with the present invention these unpredictable variations of electrical characteristics with temperature do not affect the capacitance measurement.

In accordance with another important aspect of the present invention, a guard shield monitor is provided to detect when the operational amplifier is overloaded and cannot maintain the guard shield at the same potential as the measuring electrode.

In different embodiments of the invention the probe may take the form of a top or side mounted probe, a flush mounted probe, or a flat surface probe having a guard shield.

The foregoing and other objects, features and advantages of the invention will become more apparent from the following description, drawings, and appended claims.

DESCRIPTION OF A PARTICULAR EMBODIMENT

Figure 1:
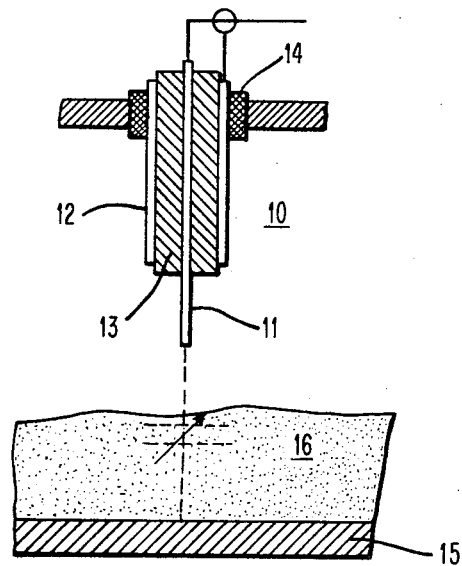
FIG. 1 shows a probe.

Referring to FIG. 1 the probe 10 includes the measuring electrode 11 and a guard shield 12. The insulation 13 is interposed between the electrode 11 and the guard shield 12. The insulation 14 is interposed between the guard shield 12 and the mounting which is normally electrically connected to the conductive member 15. The conductive member 15 normally is the container for the material 16 the level of which is to be determined. The capacitance between the measuring electrode 11 and the conductive member 15 is a measure of the level of this material. The conductive member 15 will be earth when the container is of glass or other non-conductive material.

Figure 2:
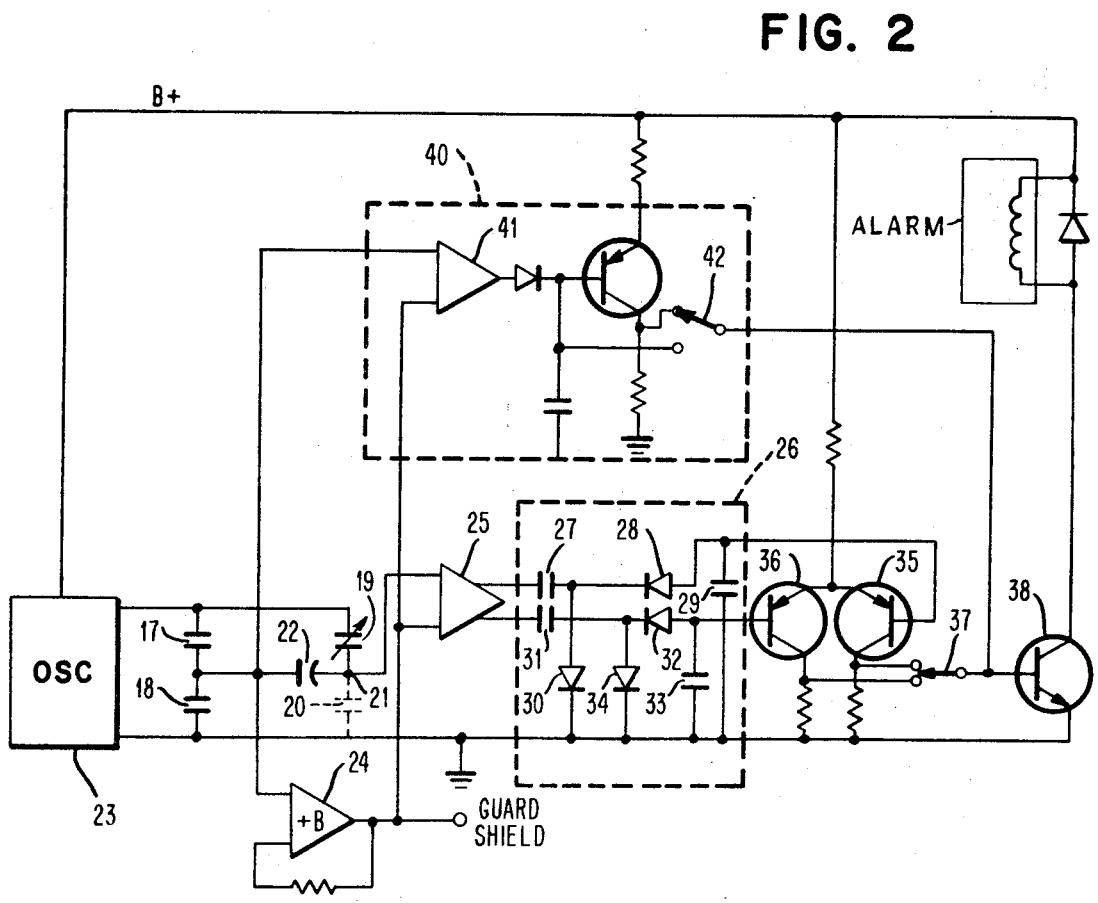
FIG. 2 shows the system.

Referring to FIG. 2 a capacitance bridge includes first and second capacitors 17 and 18 connected in two fixed adjacent arms of the bridge. A fixed reference voltage less than the oscillator voltage, is produced by the capacitors 17 and 18. The opposite adjacent arms of the bridge include a manually adjustable capacitor 19 and the variable capacitance 20 between the measuring electrode 11 and the conductive member 15. A coaxial cable from the probe connects the measuring electrode 11 to the point 21 while the conductive member is connected to reference potential. A third capacitor 22 is connected between the junction of the two adjacent arms of the bridge and the junction of the opposite adjacent arms. A constant amplitude radio frequency oscillator 23 energizes the bridge. The outer conductor of the coaxial cable is connected to the guard shield. This becomes a part of the capacitor 22. Because of this, the length of cable can be varied without changing the operating point.

A first operational amplifier 24 has its input connected to the junction of the two fixed adjacent arms. The output of operational amplifier 24 is connected to the guard shield 12. The operational amplifier 24 has essentially 100 percent feedback which maintains the guard shield at the same potential as the measuring electrode when the bridge is balanced. The output of operational amplifier 24 is also connected to the output amplifier 25. The other input to the output amplifier 25 is from the measuring electrode.

The output of amplifier 25 represents the level of material being determined. As shown in FIG. 2 the instrument is used to provide on or off relay operation when the material reaches a preset point in the vessel. It will be understood, however, that the principles of this invention may also be used in a continuous measurement type system in which an output indicative of material level is obtained.

The output of amplifier 25 is applied to phase sensitive detector 26. For one phase, capacitor 27, diode 28, capacitor 29 and diode 30 form a peak holding rectifier whose output is equal to the peak-to-peak swing of the guard shield voltage plus the output voltage. For the same phase, capacitor 31, diode 32, capacitor 33 and diode 34 form another peak holding rectifier whose output is equal to the peak-to-peak swing of the difference between the guard shield and the output voltage. The functions of these two circuits are reversed for the opposite phase. At balance the voltage on capacitors 29 and 33 are equal. When there is a departure from balance in one direction, the voltage on capacitor 29 becomes more positive and the voltage on capacitor 33 becomes less positive. When there is a departure from balance in the opposite direction, the changes of voltage on capacitors 29 and 33 are opposite. The outputs of the phase sensitive rectifier are applied through emitter followers 35 and 36 to the selector switch 37.

Transistor 38 controls a relay 39 when the measured capacitance exceeds a preset limit. The relay contacts can be used to operate alarms, solenoid valves or other devices. One of two operating modes is selectable by the switch 37. On high level fail-safe the relay 39 drops out as the level of materials exceeds a preset amount, that is, the capacitance exceeds a certain level. On low level fail-safe the relay drops out as the level of materials goes below a given amount, that is, the capacitance goes below a given level.

For proper operation of the system it is important that the operational amplifier 24 maintain the guard shield at the same potential as the measuring electrode for normal bridge balance condition. If foreign material, for example mud, is splashed between the guard electrode and the measuring electrode, there is no effect because the two are at the same potential. If mud is splashed between the guard electrode and ground, that is the container wall, the amplifier 24 has sufficient drive to keep the potential on the guard electrode constant.

Under certain conditions the deposit of foreign material may become so great that the amplifier 24 can no longer maintain the potential on the guard electrode. A guard shield monitor 40 has been provided to detect this condition and to deenergize the relay 39 when it occurs. The amplifier 41 measures the difference in voltage between the input and the output of the amplifier 24. When the difference exceeds a few millivolts the amplifier 41 acts through the selector switch 42 to cut off the relay 39. The selector switch 42 is positioned to one of its two positions in accordance with whether the system is operating in the high fail-safe or the low fail-safe mode.

Figure 2A:
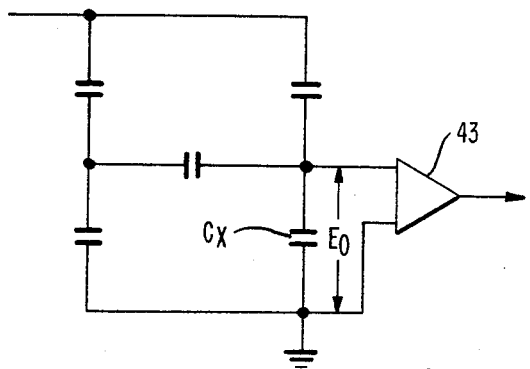
FIG. 2a shows the equivalent circuit of the prior art.
Figure 2B:
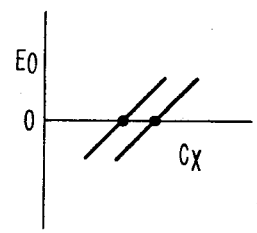
FIG. 2b shows the output voltage characteristics of the prior art.

The improved operating characteristics of the present invention can best be demonstrated with reference to FIGS. 2a–2d. FIG. 2a shows the equivalent circuit of the capacitance bridge which includes the unknown capacitance $C_x$, and the output amplifier 43. The output amplifiers in the prior art have been connected directly across the unknown capacitance. A change in the input impedance of the amplifier 43 will cause a shift in the zero point of the output voltage. FIG. 2b shows the output voltage as a function of capacitance for the prior art systems. The two lines show the operating characteristics for two different values of input impedance of the amplifier 43. It can be seen that a change in impedance causes a significant change in the capacity $C_x$ required for balance.

Figure 2C:
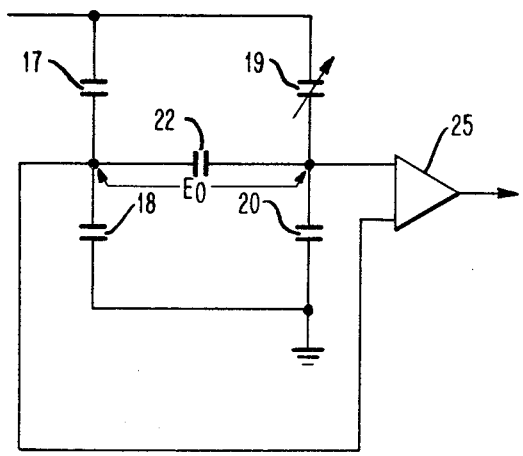
FIG. 2c shows the equivalent circuit of this invention.
Figure 2D:
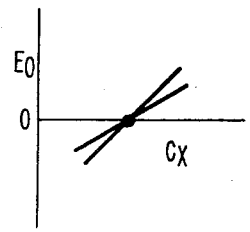
FIG. 2d shows the output voltage characteristics of the invention.

On the other hand, the equivalent circuit of the present invention is shown in FIG. 2c. A change in the input impedance of the amplifier 25 merely changes the slope of the output voltage curve. This is shown in FIG. 2d. For the same change in input impedance of the amplifier, there is no change in the capacitance required for balance. When the capacitor 22 has a high value, which is desirable, the change in the slope is negligible.

Figure 3:
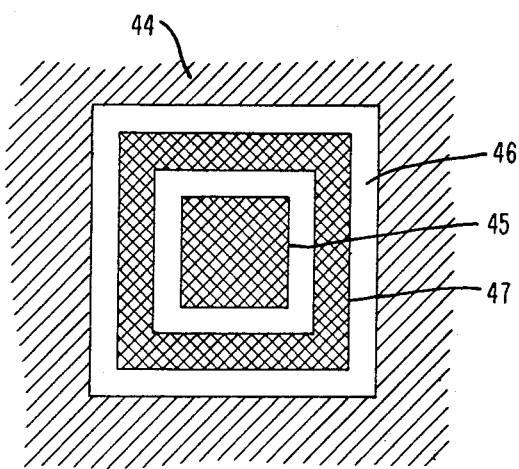
FIG. 3 shows a modification of the probe.

FIG. 3 shows a modification of the invention wherein the probe takes the form of a flush sensor. Such sensors are normally positioned on the side of a container 44 to be filled with material. A flat piece of conductive material 45 is the measuring electrode. It is positioned on insulation 46 to isolate it from the container wall. The guard shield is a hollow rectangle of conductive material 47. The guard shield completely surrounds, but is insulated from, the measuring electrode 45. Not shown is the portion of the guard shield behind the plate 45 which isolates it from grounded support member behind 45.

Figure 4:
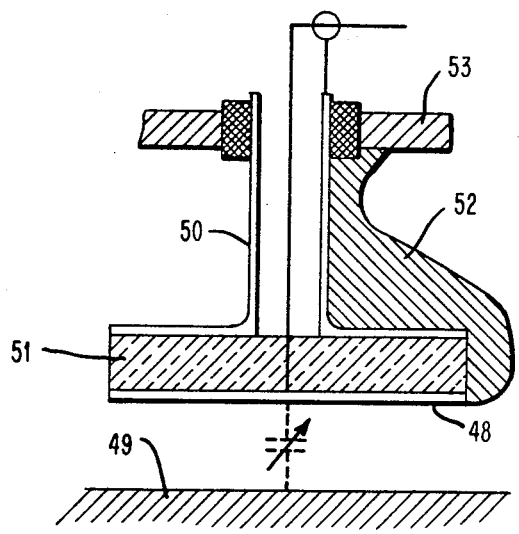
FIG. 4 shows another modification of the probe.

Another modification of the probe is shown in FIG. 4. The measuring electrode 48 is a flat surface of conductive material opposed to the surface 49 of the material whose proximity is to be determined. The guard shield 50 is separated from the measuring electrode by insulation 51. The guard shield 50 is horizontal to the measuring electrode throughout most of its area and extends vertically away from the surface of the electrode to support the measuring electrode. The guard electrode is the only exposed area of support of the electrode. When foreign material, such as mud 52, is splashed on the probe, the capacitance measurement between the measuring electrode and the material surface will not be affected. Note that in the absence of the guard electrode mud splashed between the measuring electrode 48 and the support 53, electrically connected to the surface 49, would affect the capacitance measurement.

All of the modifications of the probe of this invention have a common inventive feature. In all of the probes the guard shield extends throughout the body of the probe. This is as opposed to the construction shown, for example, in the aforementioned Atkinson patent wherein the guard electrode is on the surface of, but does not extend throughout the body of the probe.

The system described responds only to capacitive unbalance, not to resistive unbalance. In practice, there is a slight phase shift in amplifier 25 so the system will respond to small resistive unbalance.

While the connection of the output amplifier has been described with regard to a capacitance bridge, it will be appreciated that this technique of connecting the output amplifier has applicability to other measuring systems. The two fixed adjacent arms of the bridge merely provide means for producing a portion of the oscillator voltage. The operational amplifier 24 provides means for producing this portion of the oscillator voltage at a low impedance. Other techniques may be used to produce a portion of the oscillator voltage at a low impedance. For example, a resistance divider together with a high power oscillator would perform this function.

The foregoing and other modifications within the true spirit of the invention are intended to be covered by the appended claims.

What is claimed is:

1. A system responsive to the level of materials comprising:
   a conductive electrode,
   a conductive member, the variable impedance between said electrode and said conductive member being determined by the level of said materials,
   a guard shield interposed between said electrode and said conductive member,
   a source of alternating voltage having first, second and third terminals, said source generating a low amplitude alternating voltage between said first and said second terminals and a high amplitude alternating voltage between said first and said third terminals,
   means for coupling said second terminal to said guard shield so as to apply said low amplitude alternating voltage to said guard shield,
   another impedance, said variable impedance and said other impedance forming a voltage divider across said source between said first and third terminals, said low amplitude alternating voltage applied to said guard shield and the voltage across said variable impedance being substantially equal for a predetermined level of materials, and
   a detector means responsive to the difference between said low amplitude voltage and the voltage at the junction of said variable impedance and said other impedance of said divider so to indicate the level of materials in a range about said predetermined level of materials.

2. The system of claim 1 wherein said source of alternating voltage and said coupling means provide sufficient drive for said low amplitude voltage applied to said guard shield to maintain said low amplitude voltage applied to said guard shield substantially constant.

3. The system of claim 2 wherein said means for coupling said second terminal to said guard shield comprises a substantially 100 percent feedback amplifier to provide sufficient drive so as to maintain said low amplitude voltage substantially constant.

4. The system of claim 3 including fail safe means coupled between the input and the output of said feedback amplifier for sensing and indicating when the difference between said input and said output of said feedback amplifier exceeds a predetermined level.

5. The system of claim 1 comprising a probe including said conductive electrode and said guard shield, said probe further including insulation between said conductive electrode and said guard shield, said guard shield being interposed between said conductive electrode and said conductive member throughout the body of said probe.

6. The system of claim 5 wherein said conductive member comprises the wall of a container and said probe comprises a flush sensor positioned on the wall of said container, said guard shield comprising a hollow cup of conductive material completely surrounding said conductive electrode except on a detecting surface thereof, said guard shield being insulated from said conductive electrode.

7. The system of claim 5 wherein said conductive electrode comprises a flat surface opposed to the surface of said materials, said probe further comprising insulation separating said conductive electrode from said guard shield, said guard shield extending perpendicularly away from the surface of said conductive electrode, said guard shield being substantially the only support of said conductive electrode so that foreign materials splashed on said probe will not affect the capacitance between said first electrode and the surface of said materials.

8. A system responsive to the level of materials comprising:
   a conductive electrode,
   a conductive member, the variable impedance between said electrode and said conductive member being determined by the level of said materials,
   a guard shield interposed between said electrode and said conductive member,
   a capacitance bridge having first and second capacitors as two adjacent arms of said bridge and having as the opposite adjacent arms a manually adjustable capacitor and said variable impedance.
   a third capacitor connected between the junction of said two adjacent arms and the junction of said opposite adjacent arms,
   an operational amplifier having its input connected to the junction of said two adjacent arms and having its output connected to said guard shield, said operational amplifier having feedback which maintains said guard shield at the same potential as said electrode when said bridge is balanced, and
   an output amplifier having one input connected to the junction of said two opposite adjacent arms of said bridge and having the other input connected to the output of said operational amplifier so that changes in impedance of said output amplifier do not change the zero point of said bridge, the output signal of said output amplifier representing the level of said material.

9. The system recited in claim 8 further comprising a guard shield monitor including:
   a guard shield amplifier having one input connected to the junction of said first arms of said bridge and a second input connected to the output of said operational amplifier, and
   alarm means connected to the output of said monitor amplifier when the two inputs to said monitor amplifier have a difference in voltage which exceeds a predetermined amount.

* * * * *